March 17, 1964 L. I. KAPLAN 3,125,710
HIGH PRECISION CAPACITOR
Filed Oct. 28, 1958

INVENTOR.
LEO I. KAPLAN
BY
ATTORNEY

United States Patent Office 3,125,710
Patented Mar. 17, 1964

3,125,710
HIGH PRECISION CAPACITOR
Leo I. Kaplan, 11042 Mount Gleason, Sunland, Calif.
Filed Oct. 28, 1958, Ser. No. 770,053
2 Claims. (Cl. 317—249)

This invention relates to fixed capacitors and more particularly to a hermetically sealed capacitor having means operable from the exterior of the container for adjusting the capacity to a precise value and locking the adjustment in this position.

The precise design of electronic sub-assemblies requires that the individual components be manufactured to a high degree of precision. As is true of mechanical elements, the manufacture of electronic components to precise tolerances is very costly and unavoidably results in a high percentage of rejects. Accordingly, there is a growing practice to manufacture fixed capacitors to reasonably close tolerances and thereafter to subject each to a factory adjustment operation wherein the rated capacity is adjusted precisely to a desired value. According to one mode of making such an adjustment, a capacitor is wound in cylindrical form and thereafter flattened for packaging within a container of suitable rectangular size and shape. Following packaging, the flattened sides of the capacitor are subjected to pressure to vary the distance between adjacent conductive elements until the exact capacitance is achieved.

Although the foregoing procedure has certain advantages it is subject to other serious disadvantages obviated by the construction and technique provided by the present invention. For example, the flattening of the cylindrically wound capacitor element produces undesirable disconformities in the spacing between the electrically conductive members in different areas of the individual convolutions. The application of pressure to the areas opposite the flattened sides of the capacitor tends to augment these discrepancies and to impose further and unequal stresses on both the conductive members and the dielectric members. As will be appreciated, the imposition of such strains and disconformities on high precision components is undesirable and introduces weaknesses which lead to failure, a happenstance which cannot be tolerated in many operating environments, as for example, guided missiles, rocket engines, and electronic gear for aircraft.

The capacitor provided by the present invention avoids the foregoing shortcomings and provides a capacitor which is wound upon an expandable core and thereafter placed in a cylindrical container barely large enough to receive the core and capacitor sub-assembly. As one of the final steps of the assembly operation, the capacitor is placed on a high precision capacitor bridge and the axial pressure on the core is adjusted as necessary to bring the capacitor rating to the exact value desired in the finished product. The adjusting means is locked in this position while the capacitor remains in circuit with the test equipment so that a final capacity check can be made. Owing to the uniform radial pressure to which all areas of the capacitor are subjected, the entire winding is uniformly stressed and its various convolutions are placed under uniform radial compression. A superior capacitor unlikely to fail in service results. The expandable core may be formed in two nesting parts shiftable in opposite directions relative to one another to adjust the capacity rating of the device. In a second prefered form the core may comprise a cylinder of elastomeric material arranged to be compressed axially to expand the same radially. Desirably, both forms are used as a driven mandrel during assembly of the winding thereon.

One object of the present invention is to provide an improved capacitor featuring a new high precision mode of adjusting the capacity thereof.

Another object of the invention is the provision of a hermetically sealed capacitor incorporating novel means for adjusting the capacity during manufacture to a precise predetermined value notwithstanding tolerance variations in the constituent components.

Another object of the invention is the provision of a capacitor including an expandable core having means for adjusting the same to vary within limits the rated capacity of the capacitor.

Another object of the invention is the provision of a hermetically sealed capacitor wound up an expandable core and encased within a housing having means operable from its exterior to expand the core to adjust the capacity to a precise value.

Another object of the invention is the provision of a capacitor formed upon an elastomeric core and adapted to be sealed as a unit within a container one end wall of which is provided with a flexible diaphragm and an axially adjustable means for applying axial pressure to the core in a manner to adjust within limits the capacity of the capacitor.

These and other more specific objects will appear upon reading the following specification and claims and upon considering in connection therewith the attached drawing to which they relate.

Referring now to the drawing in which preferred embodiments of the invention are illustrated.

Figure 1:
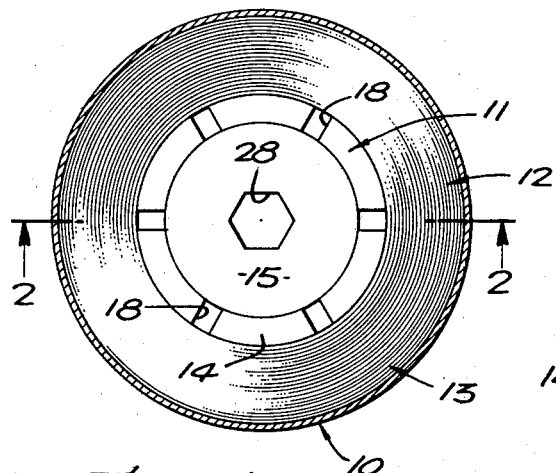
FIGURE 1 is a cross-sectional view through one preferred embodiment of the invention taken along line 1—1 on FIGURE 2.
Figure 3:
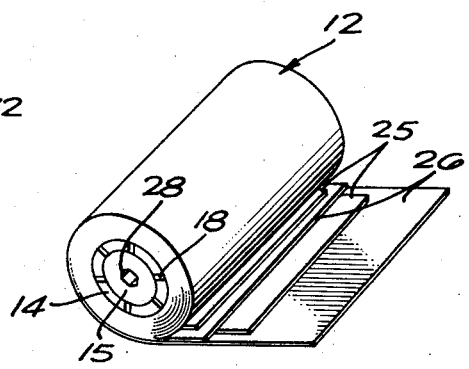
FIGURE 3 is a perspective view of the core and winding assembly in partially finished form, layers of the winding being broken away to show structural details.
Figure 2:
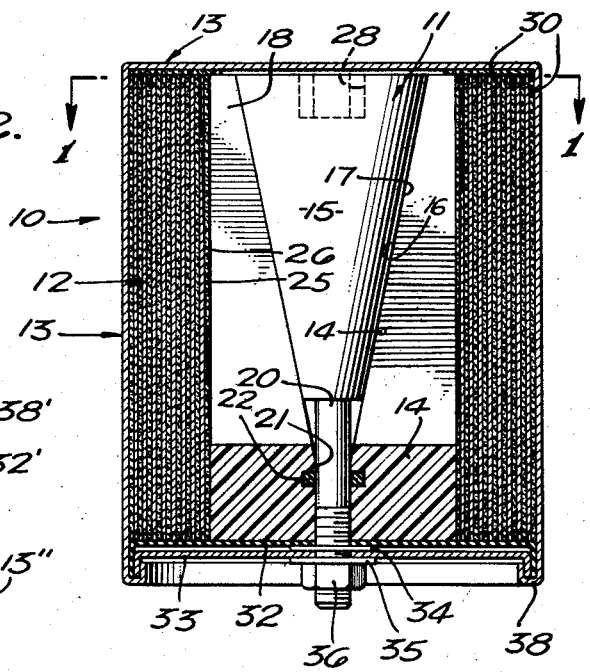
FIGURE 2 is a longitudinal cross-sectional view taken along line 2—2 on FIGURE 1.

Referring now to FIGURES 1 to 3, there is shown one preferred embodiment of a fixed capacitor designated generally 10, including as principal components an expandable core assembly designated generally 11, a winding assembly designated generally 12, and a housing 13. The core assembly includes a pair of concentric members 14 and 15 having mating tapering walls 16 and 17, the former constituting a conical seat for the conical male member 15. Outer member 14 is preferably provided with one or more radial slots 18 extending for a major portion of its length and enabling this member to expand radially as cone 15 is pressed axially into closer nesting relation within seat 16. Integral with the smaller diameter end of cone 15 is a threaded stem 20 which projects through a central bore 21 in the non-slotted end of the surrounding member 14. Preferably, this bore is provided with an annular groove seating an O-ring 22 cooperating will stem 20 to provide a fluid-tight seal for purposes which will become more evident presently.

Referring to FIGURE 3, it will be seen that the capacitor proper comprises a pair of similar strips of conductive material as foil 25, these strips being separated by thin and wider strips of suitable dielectric material 26. The two pairs of conductive and non-conductive strips 25, 26 are compactly wound upon the expandable core structure provided by the pair of nesting members 14 and 15, the amount of conductive material 25 employed being that calculated to provide a capacitor of the desired capacity. To facilitate winding strips 25, 26 upon the core elements, male member 15 is preferably provided with a non-circular axial bore 28 for seating a complementally shaped driven element of the winding equipment. The end of threaded stem 20 likewise may and preferably does include a conical countersink frictionally seating the pointed end of a tailstock or the like of the winding equipment.

After the sub-assembly shown in FIGURE 3 has been wound, it is detached as a unit from the winding equipment and inserted endwise into the open end of the metal housing 13. The latter is preferably first provided across its bottom and along its side walls with a suitable layer of insulating material 30. At this stage of the assembly it will be understood that the open end of housing 13 is co-extensive with the cylindrical side walls of the housing thereby offering no interference with the assembly operation.

After the capacitor sub-assembly has been inserted, a flexible diaphragm of rubber or the like 32 is applied along with the closure cap 33. Preferably, a washer or shim 34 is inserted between flexible diaphragm 32 and closure cap 33. A second washer 35 is applied over shank 20 on the outer side of cap 33 prior to the assembly thereover of nut 36. Housing 13 may now be sealed closed using clenching or spinning techniques well known in the art for this purpose by which lip 38 of the container side wall is swaged inwardly about the upturned rims of diaphragm 32 and closure cap 33.

It is pointed out that each of the conductive strips 25, 26 is provided with an insulated lead wire in known manner attached to insulated terminals mounted in one end wall of container 13. Such terminals and bushings are not shown in FIGURE 2 but will be understood to be of any type well known in the art.

Following completion of the capacitor its terminals are connected across a precision capacitor bridge in circuit with a suitable power supply and instruments for charging and determining the capacity under specified conditions. A wrench is then applied to nut 36 tightening the same to draw cone 15 into closer nesting relation with the radially split surrounding core member 14 thereby applying outwardly directed compressive pressures to winding 12 thereby adjusting the capacity of the unit until the instruments show that it has the precise capacity desired in the finished product. The flexible diaphragm 32 in cooperation with the O-ring 22 and the tightly clenched lip 38 of the container provide assurance that the contents of housing 13 remain hermetically sealed despite adjustment of the nesting core members 14 and 15. Although not shown, it will be understood that a lock nut may be applied to the exposed outer end of stem 20 and serving to lock the capacitor in its adjusted position.

Figure 4:
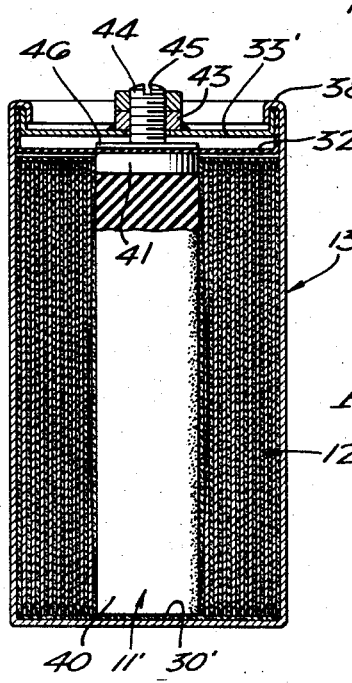
FIGURE 4 is a longitudinal sectional view through a second preferred embodiment of the invention, the one-piece core being shown partially in section and partially in elevation.

Referring now to FIGURE 4, there is shown a second preferred embodiment of the invention differing in no major respect from the first described embodiment except as respects the expandable core element 11' which preferably comprises a cylindrical member of resilient rubber or other suitable elastomeric material 40. The same or similar components are designated by the same reference characters as in the first embodiment but are distinguished therefrom by the addition of a prime. Core 11' is substantially co-extensive in length with capacitor windings 12', one end being substantially flush with the inner end of the winding and the other end terminating close to the opposite end edge of the winding and seating there opposite a suitable bearing disc 41. Welded to the center of casing end cap 33' is a nut 43 seating a cap screw 44 having a slotted outer end 45 for receiving a screwdriver or other tool. The inner end of set screw 44 bears against a bearing disc 46 which may be bonded to the center of flexible diaphragm 32'.

Capacitor windings 12' are preferably wound directly upon the elastomeric core 40 in a manner similar to that described above in connection with FIGURES 1 to 3. This assembly together with its mandrel or core 40 is inserted into container 13' and closure cap 33' is assembled in the same manner described above after which container lip 38' is clenched against the interior surface of the outwardly turned rim edge of cap 33'. Since the upturned edges of the flexible impervious diaphragm 32' are preferably located between the parts clenched together, it will be recognized that the contents of container 13' are hermetically sealed. Although, not shown, it will be understood that the two conductive strips of the condenser are provided with insulated terminals extending through a wall of container 13' in known manner.

The adjustment of the capacity of the described assembly is carried out in the same manner described above for the first embodiment, screw 44 being rotated by a screwdriver or other tool to place the expandable core element 11' under axial pressure from its opposite ends. Since rubber and other elastomeric materials are non-compressible the axial pressure applied to core 40 is effective to expand this element uniformly in all radial directions perpendicular to its longitudinal axis. This forces the windings of the capacitor into firmer and closer contact with one another uniformly throughout their several convolutions. Normally, the expansion of the core required to obtain a desired capacity rating is insufficient to apply any particular radial pressure on the side walls of container 13'. Under certain conditions, however, the containers walls may be placed in slight hoop tension.

While the particular high precision fixed capacitor and method of manufacturing the same herein shown and disclosed in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

I claim:

1. A hermetically sealed capacitor comprising multiple convolutions of spirally wound pairs of superimposed strips of conductive and non-conductive material, a cylindrical housing, an imperforate flexible diaphragm between one end wall of said housing and an expandable core extending axially through the center of said spirally wound strips, and means carried by said housing operable from the exterior thereof for applying axial pressure to said expandable core through said flexible diaphragm in a manner to place all portions of said strips under substantially uniformly distributed pressure to adjust the capacity of said conductive strip.

2. A capacitor as defined in claim 1 characterized in that said core comprises a substantially solid cylindrical element of elastomeric material.

References Cited in the file of this patent

UNITED STATES PATENTS

| 2,318,415 | Patzshke | May 4, 1943 |
| 2,641,647 | Wallin | June 9, 1953 |
| 2,794,160 | Wadsworth | May 28, 1957 |
| 2,799,816 | Schwartz | July 16, 1957 |

FOREIGN PATENTS

| 381,494 | Great Britain | Oct. 6, 1932 |
| 547,123 | Germany | Mar. 19, 1932 |